July 13, 1965
H. S. POLIN
3,195,011
ELECTRONIC CLOCKS
Filed Aug. 6, 1962
3 Sheets-Sheet 1
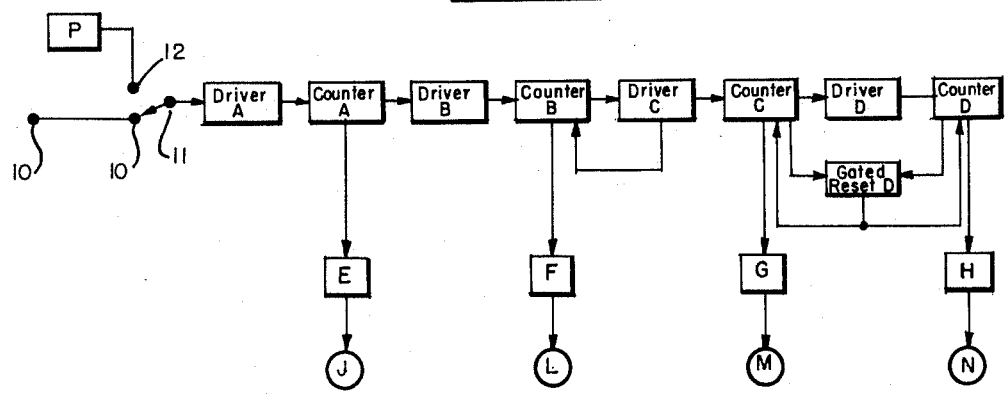
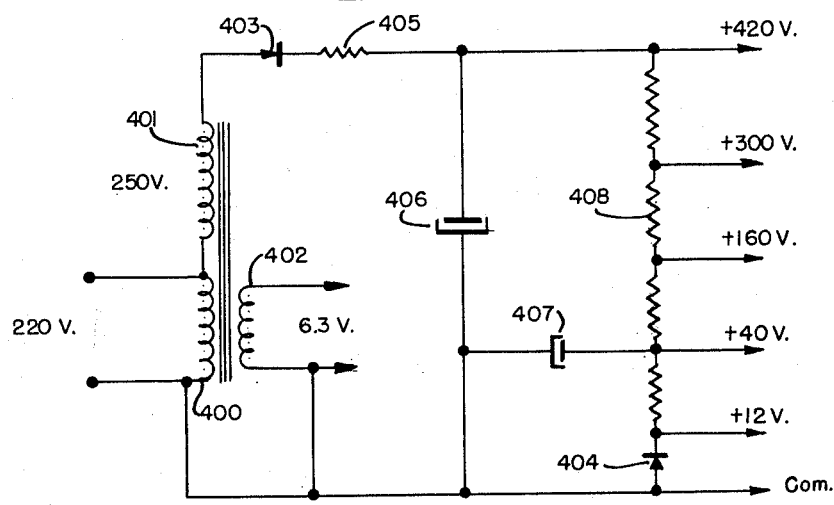
INVENTOR
Herbert S. Polin
BY *Moore & Hall*
ATTORNEYS July 13, 1965

H. S. POLIN 3,195,011

ELECTRONIC CLOCKS

Filed Aug. 6, 1962

INVENTOR
Herbert S. Polin
BY *Moore & Hall*
ATTORNEYS

July 13, 1965 H. S. POLIN 3,195,011
ELECTRONIC CLOCKS
Filed Aug. 6, 1962 3 Sheets-Sheet 3

INVENTOR
Herbert S. Polin
BY
ATTORNEYS

United States Patent Office 3,195,011
Patented July 13, 1965

3,195,011
ELECTRONIC CLOCKS
Herbert S. Polin, Veyrier, near Geneva, Switzerland, assignor to P. Vogel and Company, Geneva, Switzerland, a corporation of Switzerland
Filed Aug. 6, 1962, Ser. No. 214,882
6 Claims. (Cl. 315—84.6)

The present invention relates to an electronic clock having no macroscopic moving parts.

It is an object of the invention to provide an electronic clock comprising a counting circuit producing electric pulses equivalent to seconds, minutes and hours for the representation of time in a clock without moving parts.

It is an object of the invention to provide an electronic clock having digital display of hours, minutes and seconds.

It is an object of the invention to utilize line frequency of 50 or 60 cycles per second to supply clock pulses as input signals at the rate of one pulse per minute or to utilize a self-oscillating generator.

It is an object of the invention to provide a digital electronic clock circuit having four counters connected in series, each having a separate output driving a digital indicator through suitable switching units.

Reference is made to the following publications for background on standard details of computer circuits known to the art, High-Speed Computing Devices, by Engineering Research Associates Inc., edited by W. W. Stifler, Jr., McGraw-Hill Book Co., Inc., 1950; An Introduction to Electronic Data Processing, Nett and Hetzler, Free Press of Glencoe, Illinois, 1959; Giant Brains, E. C. Berkeley, J. Wiley and Sons, Inc., 1949; Arithmetic Operations in Digital Computers, R. K. Richards, D. Van Nostrand Co., Inc., 1955; and Theory and Techniques for Design of Electronic Digital Computers, by the staff of Moore School of Electrical Engineering, University of Pennsylvania, Philadelphia, 1946, 2 vols.

A preferred form of clock structure embodying the invention comprises four ring decade counters connected in cascade and provided with a separate output for each counter to represent the four digits normally used for digital time display. Power supply line frequency provides for basic time measurement. Each of the four outputs is connected to a display unit through a switching unit for the proper numeral in each digital position.

Reference is made to the drawing which is presented as illustrative of one form of the invention may take and is not to be construed as limiting. Like numerals refer to like parts throughout.

In the drawings:

FIGURE 1 is a schematic block diagram of a digital clock according to the invention.

FIGURE 2 is a schematic circuit diagram of one form of power supply according to the invention.

FIGURE 3 is a schematic circuit diagram of one form of digital clock.

Figure 3A:
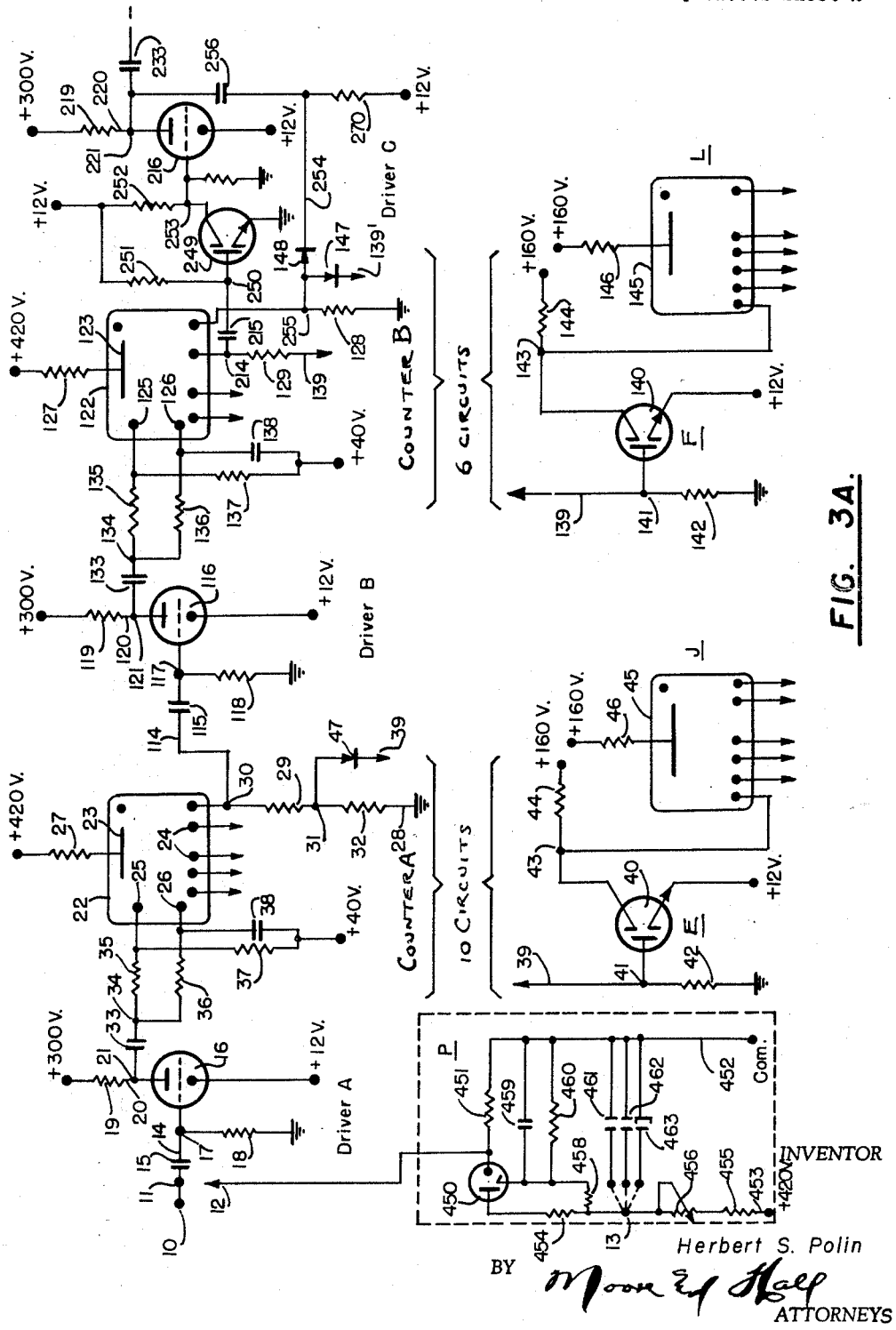
FIGURES 3A and 3B combine as a single figure.

The block diagram of FIGURE 1 is representative of one form of the invention which is shown in detail in FIGURE 2. The circuit of FIGURE 2 may of course be transistorized or embodied in equivalent microelectronic circuitry employing silicon wafers on which the passive and active elements may be formed by diffusion methods which deposit a thin film on the silicon wafer which may be masked or etched to provide impedances, inductances, capacitances, resistances as passive circuit elements and active solid state elements which are the equivalent of diodes, triodes and the like. Related early teachings are found in the work of Dr. Pierre M. G. Toulon in connection with multi-element flat screen or mural television construction and grid signal distribution systems therefor of which his U.S. Patent Nos. 2,541,133; 2,558,019; 2,565,-102; 2,595,617; 2,848,536; 2,967,904 and references therein are pertinent here. The invention may be incorporated in molectronic devices and may comprise microminiaturized modular circuits, thin film techniques in which metal is diffused upon an insulating or semi-conductor surface in the form of active and passive circuit components all correctly connected to make an operative circuit, sub-assembly or entire device. Thin film transistors may be employed as active circuit components, replacing vacuum tubes and the great labor of physically connecting circuit components with the resultant high probability of failure or malfunction minimized or substantially eliminated. Again, glass or other insulators may replace semi-conductor material such as the ferrites, silicon and the like.

The block diagram of FIGURE 1 shows a clock providing digital display of hours and minutes according to the invention. Terminal 10 is supplied with input pulses at a rate of one pulse per minute which may be supplied by a self-oscillating generator of normal construction or may be obtained from the usual power supply having a line frequency of fifty or sixty cycles per second as the case may be in a particular locality. Where the line supply frequency is standardized at fifty cycles per second, the input signal of one pulse per minute may be obtained by scaling the frequency down through two cascaded counters. That is, a fifty pulse counter will give one output pulse for every fifty input pulses. If this output pulse is supplied as an input signal to a sixty pulse counter such a counter will give one output pulse every minute if the first counter is supplied with fifty cycle line power. For sixty cycle line supply, two sixty pulse counters are connected in cascade to produce the one pulse per minute input signal for terminal 10. Reference is made to Chapter 7 on Counting of Digital Computers, supra.

The clock comprises four counters A, B, C, and D connected in series or cascade. Each counter also has a separate output, said outputs being connected respectively to four digital display indicators J, L, M, and N, which provide a digital time indication, e.g. 12:36. Switching units E, F, G, and H, respectively connect each counter with the corresponding digital indicators. It will be understood that digital representation and clock-face-hand-position representations may be controlled by substantially the same basic computer logic.

A switch button or the like 11 disconnects the clock circuit from the regular input signal and connects it to a free-running oscillator P which supplies an accelerated pulse sequence providing rapid advance for quick setting of the indicator at any desired value. Oscillator P is preferably constructed to provide a fast pulse rate for quick approximate setting of the indicator and a slow pulse rate to provide a fine adjustment to substantially the exact time. Switch 11 can be a three-position switch with the slow pulse rate terminal between terminal 10 and fast pulse rate terminal or the rate can be changed by a switch 13 in the oscillator P with switch 11 having two positions, one connected to terminal 10 for the input signal and the other connected to terminal 12 for the setting pulse sequence.

Switch 11 is connected by wire 14 containing condenser 15 to the control grid of driver or triode 16 for driving counter A. Wire 14 is suitably grounded at junction 17 through a high resistance or grid leak 18. Driver tube 16 has its cathode connected to the +12 v. terminal of the power supply and its plate connected to the +300 v. terminal through current limiting resistance 19 in wire 20, containing junction 21 for supplying power to counter A.

Counters A, B, C, and D are here each shown as scale-of-ten counters of known construction called decatron tubes 22 having thirty cold cathodes in one envelope. The cathodes are rod shaped and arranged around a circular disc anode 23. Ten of the electrodes 24 are termed cathodes, ten are termed first guides 25 and ten are termed second guides 26. The cathodes 24, first guides 25 and second guides 26 are inter-meshed and inter-related in cyclic order. The common anode or plate 23 is connected to +420 v. on the power supply through current limiting resistor 27. In the quiescent state each of the ten cathodes is at ground potential through a wire 28 containing resistances 29 between junctions 30 and 31 and resistance 32. The application of successive pairs of negative pulses to the first and second guides transfers the glow discharge from cathode to cathode in succession.

Figure 3B:
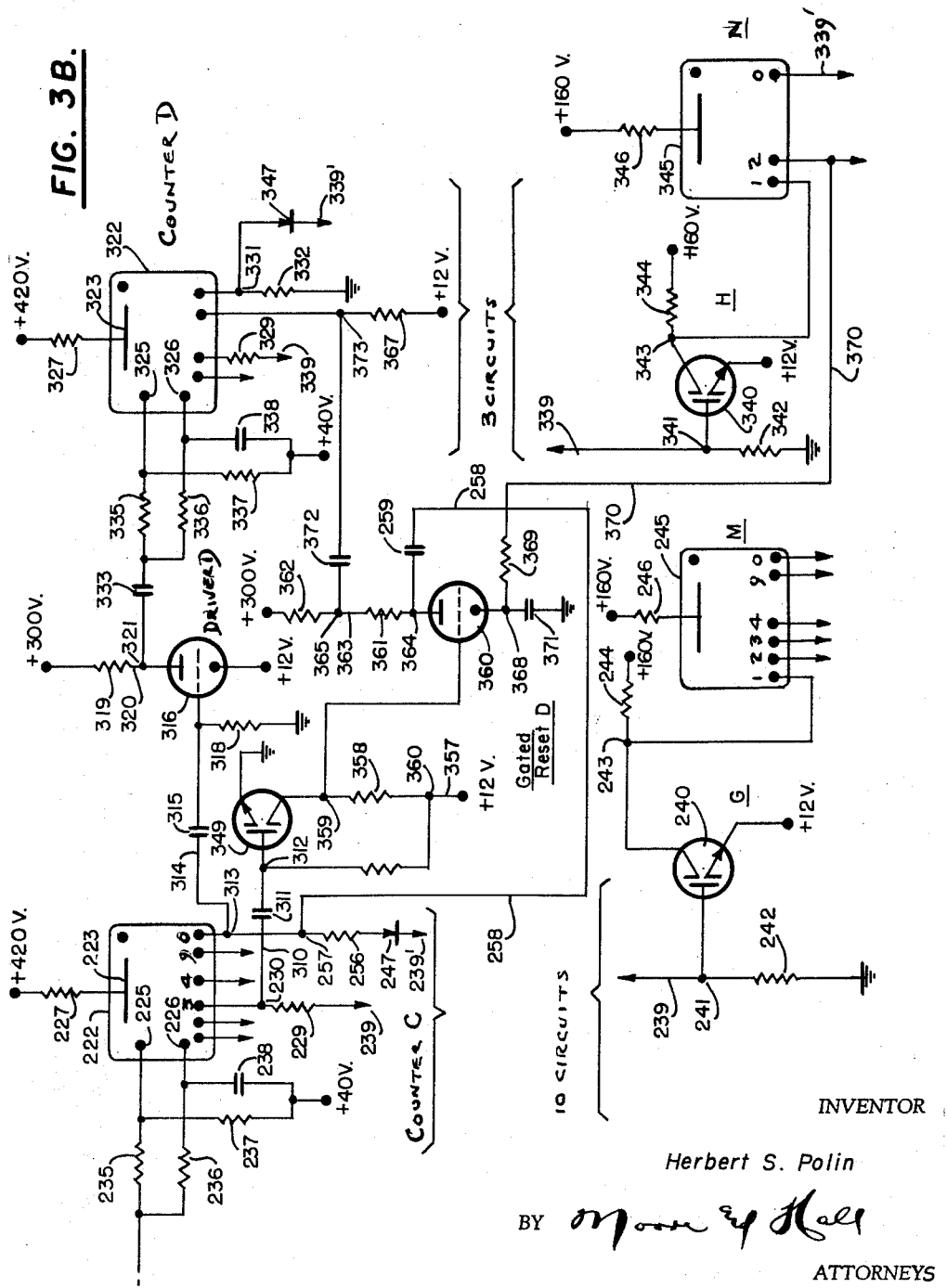

Reference is made to an article entitled "Polycathode Counter Tube Applications," published in Electronics, issue of November 1953. Also see U.S. Patent No. 2,794,179, FIGURE 4B and U.S. Patent No. 2,955,278, FIGURE 3B of H. C. Sibley. In the decatron 22 the main cathodes are spaced too far apart for the glow discharge to transfer from cathode to cathode. Pairs of guides 25 and 26 are spaced between each cathode 24, so that when negative pulses are applied the glow discharge jumps or transfers to the first guide on the first negative pulse, to the second guide and on to the next cathode 24. A negative from junction 34 appears at once at guide 25 and has a duration determined by the discharge time of condenser 33. This discharge charges condenser 38 before a negative pulse appears on guide 26. This circuit provides the negative pulse pair which transfers. It will be understood that cathode zero is adjacent cathode 1 in decatron 22.

Junction 21 connects the plate output of driver tube 16 through decoupling condenser 33 to junction 34 to supply negative pairs of pulses to the guides 25 and 26. A network comprising resistances 35 and 36 connects guides 25 and 26 to junction 34 and to +40 v. on the power supply through resistance 37 and condenser 38, respectively. These connections provide the negative pulse pairs referred to above which act to transfer the glow discharge from one cathode 24 to the next cathode 24, successively.

When the glow discharge is transferred to a given cathode 24 a current flows through its respective wire 29 and develops a positive voltage across the resistances 29 and 32 which is supplied by wire 39 to switching unit E to actuate indicator J to display the state of the count, i.e. the last digit "6" in the time indication, 12:36, referred to above.

As stated above, the decatron tubes 22 are known to the art. However, r-triode modulo r counters, comprising gas-filled triodes may be used in the present invention as decade counters of the ring type as shown at Figure 3-6 on page 22 of High-Speed Computing Devices, supra. Reference is also made to Electrical Counting, Chapter VIII, by W. B. Lewis, Cambridge University Press, New York, 1942, and Electronic Counter for Rapid Impulses, by Wellman and Roeder, Electronics, vol. 15, No. 10, pp. 74, 140–142 (October 1942). See also FIGS. 1 and 6 of U.S. Patent No. 2,541,133; FIGS. 4–10 incl. of U.S. Patent No. 2,565,102; U.S. Patent No. 2,565,103 and FIG. 1 of U.S. Patent No. 2,848,536, all by Dr. Pierre M. G. Toulon, showing sequential signal pulse distribution over a plurality of channels.

Switching unit E has ten wires 39, one for each of the ten cathodes 24 of multi-cathode tube 22 of counter A. Unit E comprises ten switches each having a transistor 40 the base of which is connected to junction 41 with wire 39 and grounded through current limiting resistor 42. The emitter of transistor 40 is connected to +12 v. on the power supply and the collector to junction 43 and +160 v. on the power supply through current limiting resistor 44. Junction 43 is connected to the first terminal on gas discharge tube 45 of indicator J. The anode of display tube 45 is connected to +160 v. on the power supply through current limiting resistance 46. Tube 45 may be a "Charactertron" having the ten Arabic numeral characters superposed one below the other and energized in sequence by the ten gas discharge tubes 40 of switching unit E. As a voltage pulse appears at each successive junction 43, each successive numeral from 0 to 9 is illuminated in turn and remains illuminated for one full minute as determined by the signal pulses applied to terminal 10. Tube 45 is shown in the drawing as a decimal display tube of the gas discharge type which is well known in the art. Display tube 45 is a minute indicator, stepping forward minute-by-minute and resetting to zero every ten pulses.

Junction 30 of cathode zero of counter A tube 22 is connected by wire 114 through de-coupling condenser 115 and junction 117 to the control grid of triode 116 of driver B of counter B. Junction 117 is grounded through resistance 118. The cathode of driver tube 116 is connected to +12 v. on the power supply and the anode to junction 121, decoupling condenser 133 and first and second guides 125 and 126 of multi-cathode tube 122 of counter B. The circuits are the same as shown by similar numerals applied to the elements, but increased by one hundred, comprising junction 134, resistances 135, 136, 137 and condenser 138.

Multi-cathode tube 122 of counter B is also a decatron, but uses only six counting channels 139 as there are sixty minutes in an hour. Tube 122, therefore, causes display tube 145 to recycle to zero after each series of five pulses. In all other respects tube 145 functions in the same manner as tube 45, both indicating zero every sixtieth signal pulse applied to terminal 10. Of course tube 45 cycles six times to each cycle of tube 145.

There are six channels 139 connecting multi-cathode tube 122, switching unit F and display indicator unit L, each channel 139 is connected to elements 140–144, corresponding to those of unit E. The only change is that the last switch circuit which is connected to 139' does not have a resistance 142. Display tube jumps from Arabic numeral five to zero in response to a pulse on wire 139' from the zero cathode within tube 122 of counter B. Elements 47, 147 and 148 are blocking diodes or rectifiers which act as decouplers and block a return signal, both D.C. and A.C.

Decatron tube 122 recycles for every six pulses appearing at junction 121 from the anode of tube 116 of driver B. This recycling of tube 122 is accomplished by driver C which performs the double function of pulsing counter C and supplies a resetting pulse returning tube 122 to zero at every sixth input pulse. Driver C comprises a transistor 249 the base of which is connected to the fifth cathode of decatron 122 by wire 214, containing decoupling condenser 215 and junction 250. Junction 250 and the base of transistor 249 are connected to the +12 v. terminal of the power supply through current limiting resistor 251. The emitter is grounded and the collector connected to the +12 v. terminal through resistance 252 at junction 253. Transistor 249 is an inverter-amplifier which pulses the control grid of triode 216 of driver C. The cathode of triode 216 is connected to the +12 v. power terminal and the anode to the +300 v. power terminal through resistance 219 at junction 221 in wire 220. The negative pulse output signal appearing at junction 221 is supplied to first and second guides 225 and 226 of decatron 222 of driver C through the network comprising resistances 235, 236 and 237 and condenser 238 connected to the +12 v. power terminal and decoupling condenser 233 as described in counter A. The resetting pulse for counter B is taken from junction 221 by wire 254 leading to junction 255 with the zero cathode terminal of decatron 122. Wire 254 is connected through resistance 270 to the +12 v. power terminal which is blocked from junction 221 by condenser 256 and diode-rectifier 148. A negative pulse at junction 221 in addition to advancing decatron 222 also passes condenser 256 and diode-rectifiers 148 and 147 and appears at the zero cathode of both decatrons 122 and 145, resetting them to zero and ready to count the next pulse appearing at junction 134 from driver B.

Anode 223 of decatron 222 is connected to +420 v. power terminal through resistance 227. Output pulses appear sequentially at the ten cathodes which are connected to the ten character channels of display tube 245 through the ten switching circuits of switching unit G, each having a transistor 240 and associated circuitry connected by a wire 239 and containing resistances 242 and 244 together with junctions 241 and 243, except the zero switch circuit which does not have a resistance 242.

The zero cathode of decatron 222 is connected by wire 239' containing resistance 256 and blocking diode-rectifier 247 to the tenth and last transistor circuit of switching unit G which, as stated, lacks a resistance 242. Wire 239' supplies a pulse to the zero display tube 245 and resets the tube in response to a pulse from gated reset D on wire 258 connected to wire 239' at junction 257.

The wire 239 leading from the third cathode of decatron 222 contains a junction 230 which is connected by a wire 310 containing decoupling condenser 311 and junction 312 to the base of transistor 349 of the gated reset D. The emitter of transistor 349 is grounded and the collector connected to the +12 v. power terminal by wire 357, containing resistance 358 and junctions 359 and 360. Resistance 361 connects junctions 312 and 360. Junction 359 is connected to the control grid of triode 360 of gated reset D. The anode of triode 360 is connected to +300 v. power supply terminal through two resistances 361 and 362 in series in wire 363 which contains junctions 364 and 365. The wire 258 which conveys the reset pulse for tubes 222 and 245 to junction 257 contains condenser 259 and is connected to the anode of triode 360 at junction 364.

The zero cathode of decatron 222 is connected to the control grid of triode 316 of driver D by wire 314 containing decoupling condenser 315 and connected to junction 313 on wire 239'. The control grid of triode 316 is grounded through grid leak resistance 318 and the cathode is supplied from +12 v. power terminal. The anode of triode 316 of driver D is connected to the +300 v. power terminal by wire 320 containing junction 321 and current limiting resistance 319.

Decatron 322 of counter D is driven by successive pairs of negative pulses from junction 321 which are applied to first and second guides 325 and 326 through the network comprising resistances 335, 336 and 337 together with condenser 338 and a bias voltage supplied from the +40 v. power terminal. Anode 323 is connected to +420 v. power terminal through resistance 327. The first and second cathodes of decatron 322 are connected to display tube 345 of display N through switching unit H by wires 339. Each switch circuit comprises a transistor 340, resistances 342 and 344 with wiring junctions 341 and 343. The third switching circuit connecting wire 339' to the zero display channel of tube 345 does not utilize a resistor 342. The anode of display tube 345 is connected to +160 v. power terminal through resistance 346. The second cathode of display tube 345 is connected by wire 370 and resistance 369 to the cathode of triode at junction 368 which is grounded through condenser 371. The ninth cathode of decatron 322 is connected to +12 v. power terminal through resistance 367 and to the anode of tube 360 at junction 365 by wire 366, condenser 372 and junction 373. The zero cathode of decatron 322 is grounded through resistance 332 and connected at junction 331 to switching unit H through diode-rectifier 347 by wire 339'.

The power supply comprises an auto transformer 400 connected across a line supply with series coil 401 on the same core to provide a sufficient voltage boost above line voltage to yield +420 v. A separate secondary winding 402 supplies +6.3 v. across its terminals. A network, comprising diode-rectifiers 403 and 404, resistance 405 and dielectric condensers 406 and 407, is connected to a potentiometer or divided resistance 408 having six terminals providing in sequence direct current voltages of +420 v., +300 v., +160 v., +40 v., +12 v. and a common return to ground to which those wires having ground symbols in the drawings are connected.

The digital indicator display tubes can be rapidly set to any desired time indication by turning switch 11 from input signal terminal 10 to reset terminal 12 of the setting oscillator P, comprising a triode 450 the cathode of which is connected to the common network through resistance 451 by wire 452. The anode of triode 450 is connected to +420 v. power terminal by wire 453 containing resistances 454 and 455, variable resistance 456 and frequency selector switch 13 for fast and fine setting so that the correct time indication may be rapidly achieved when the clock is being set.

The basic resonant circuit comprises condenser 459 and resistance 460 in parallel across resistance 451 and the grid and cathode of triode 450. Selector switch 13 may be adjusted to add conendsers 461, 462 and dielectric condenser 463 in parallel with condenser 459 to adjust the time constant of the resonant circuit and thereby the frequency of setting pulses supplied to terminal 12. A resistance 458 is connected in series with resistance 454 between the anode and grid of triode 450, selector switch 13 being connected to their junction.

*Operation*

Referring to the block diagram of FIGURE 1, each of the four decade counters connected in series has an output, driving a digital indicator. In the quiescent state the cathodes are at earth potential, the anodes at a potential of about +420 v. and the guides biased positively at +40 v. The timing signal pulses are changed into successive pairs of negative pulses and applied to the first and second guides, respectively, to transfer the glow discharge in steps from cathode to cathode.

Input signals applied to driver A at the rate of one positive pulse per minute produce negative pairs of pulses at the input of counter A and transfer the glow discharge from cathode to cathode minute by minute. When the glow discharge is established at a cathode, current flow through the load resistor develops a positive voltage which is applied through switching unit E to gas discharge display J to indicate the state of the count. The ten cathode outputs are controlled by the ten switches of unit E and supplied to the proper channel of the decimal digit gas discharge display J which is a minutes indicator, stepping forward at the rate of one indication per minute and resetting to zero every ten pulses.

Every time counter A completes a cycle of ten an output pulse is transmitted from cathode zero to driver B of counter B which re-cycles every six input pulses instead of ten. The re-cycling of counter B both transfers a pulse to counter C and resets counter B to zero every sixth pulse. Driver C is supplied from cathode five of counter B, through a transistor inverter-amplifier. The negative output pulse of driver C is fed back to cathode zero of counter B and at the same time applied to the guides of counter C.

In counter B only cathodes zero to five are active. They are connected through the six switches of unit F to the corresponding digits of the tens of minutes indicator L. When counter B is reset as occurs every hour, counter C advances one step. All ten cathodes of counter C are used to drive the hours indicator M through the ten switches of unit G.

A pulse is produced for each complete cycle of ten pulses at the cathode zero of counter C and is transmitted to driver D. The amplified output is supplied to the guides of tens of hours counter D. Only cathodes zero, one and two of this counter are connected through three switches of unit H to the corresponding digits of the tens of hours indicator N.

Gated reset circuit D, which is basically a two-input "and" circuit, compares the signals coming from the third cathodes of hour counter C and from the second cathode of tens of hours indicator N. The output of the gated reset circuit D is connected to both zero cathodes of counter C and counter D. Every twenty-four hours upon the arrival of the 24th pulse both counter C and counter D are reset to zero.

I claim:

1. An electronic clock comprising a counter array comprising a plurality of counters connected in series with one another, said series connected counter array having an input, the counters in said array having separate outputs respectively connected to display indicators arranged to provide a time indication, a primary pulse source coupled to said input of said series connected counters for stepping said counters and for operating said display indicators at a predetermined rate and in a predetermined sequence, a secondary source of pulses operative to produce pulses at a repetition rate in excess of said primary pulse source, and switch means for selectively disconnecting said primary pulse source from said input and for applying pulses from said secondary source to the input of said series connected counters thereby to permit the time indication effected by said display indicators to be repadily set to a desired indication.

2. The combination of claim 1 wherein said secondary pulse source includes means operable to provide output pulses at a plurality of different repetition rates each of which is in excess of that of said primary pulses source, said switch means including selecting means coupled to said secondary pulse source for supplying pulses to the input of said series connected counters at selected different ones of real repetition rates thereby to permit said time indication to be coarse-set approximately to a desired indication at a rapid rate, and then to be fine-set to a desired indication at a slower rate.

3. The arrangement of claim 2 wherein said secondary pulse source includes an oscillator, said selecting means including means operative to vary the output frequency of said oscillator.

4. In an electronic clock of the type comprising a plurality of counters connected in cascade, said counters having outputs connected to display indicators, and said cascaded counters being energized by a source of oscillations having a predetermined fixed frequency operative to step said counters and to operate said display indicators at a predetermined rate and in a predetermined sequence, thereby to continuously provide a time indication, the improvement which comprises a secondary source of oscillations having an output frequency higher than said predetermined fixed frequency, and time setting means for selectively applying the output of said secondary source to the input of said cascade connected counters thereby to set the time indication effected by said display indicators rapidly to a desired indication, said time setting means including means for varying the repetition rate of said secondary source thereby to permit both coarse and fine adjustments in the setting of said time indication.

5. The clock of claim 4 wherein said secondary source includes an oscillator having a resonant circuit including reactive elements, said means for varying the repetition rate of said secondary source including means for varying the reactive impedance in said resonant circuit.

6. The clock of claim 4 wherein said secondary source including oscillator means having a plurality of output terminals respectively providing pulse signals at a plurality of different repetition rates, said means for varying the repetition rate of said secondary source comprising switch means movable from one to another of said output terminals for coupling pulse signals at a selected one of said different repetition rates to the input of said cascade connected counters.

References Cited by the Examiner

UNITED STATES PATENTS 2,410,156  10/46  Flory _____ 58—26
2,542,021  2/51   Fox _____ 58—126

ARTHUR GAUSS, *Primary Examiner.*

Notice of Adverse Decision in Interference

In Interference No. 95,558 involving Patent No. 3,195,011, H. S. Polin, ELECTRONIC CLOCKS, final judgment adverse to the patentee was rendered Aug. 1, 1968, as to claim 1.

[*Official Gazette October 29, 1968.*]